United States Patent [19]

Dargatz et al.

[11] 3,722,853
[45] Mar. 27, 1973

[54] PILFER-PROOF VALVE

[75] Inventors: Theodore A. Dargatz; Erwin E. Hirschberg, both of Rockford, Ill.

[73] Assignee: Eclipse Fuel Engineering Co., Rockford, Ill.

[22] Filed: Dec. 8, 1971

[21] Appl. No.: 205,992

[52] U.S. Cl. ................................ 251/110, 137/385
[51] Int. Cl. .............................................. F16k 35/06
[58] Field of Search ..................... 137/385; 251/89

[56] References Cited

UNITED STATES PATENTS

| 1,231,164 | 6/1917 | Jahns et al. | 251/112 X |
| 1,669,305 | 5/1928 | Patierno | 251/110 |
| 2,994,503 | 8/1961 | Smith | 251/110 |

*Primary Examiner*—Henry T. Klinksiek
*Attorney*—Wolfe et al.

[57] ABSTRACT

A locking screw is threaded into and retained permanently in the valve member of the valve and prevents rotation of the valve member upon being projected into a locked position in response to the turning of a specially designed laterally flexible tool inserted into the valve body and detachably connected in torque-transmitting engagement with one end of the screw.

6 Claims, 5 Drawing Figures

PILFER-PROOF VALVE

BACKGROUND OF THE INVENTION

This invention relates to a pilfer-proof valve and, more particularly, to a valve of the type in which a rotatable valve member may be locked to the valve body by a locking pin so as to prevent unauthorized opening of the valve. Valves of this general type are disclosed in U.S. Pat. Nos. 102,290; 580,940 and 3,560,130.

SUMMARY OF THE INVENTION

The general aim of the present invention is to provide a new and improved pilfer-proof valve which includes a self-contained locking pin to avoid the need of installing a pin in the valve each time the valve is locked and which, at the same time, is simpler in construction and is more tamper-proof than prior valves of the same general character.

A more detailed object is to achieve the foregoing through the provision of a valve in which the locking pin is incorporated in and remains permanently with the rotatable valve member so that the pin need only be moved to a locked position and need not actually be installed in the valve when it is desired to lock the valve, the pin being concealed in and protected by the valve member to reduce the danger of the pin being broken or destroyed by unauthorized persons.

A further object is to locate the locking pin in the valve in such a position as to make it more difficult for unauthorized persons to see and gain access to the pin for purposes of unlocking the pin.

The invention also resides in captivating the locking pin in the valve member to prevent total removal of the pin from the valve member when the pin is unlocked by an authorized person.

These and other objects and advantages of the invention will become more apparent from the following detailed description when taken in conjunction with the accompanying drawings.

DETAILED DESCRIPTION OF THE PREFERRED EMBODIMENT

Figure 1:
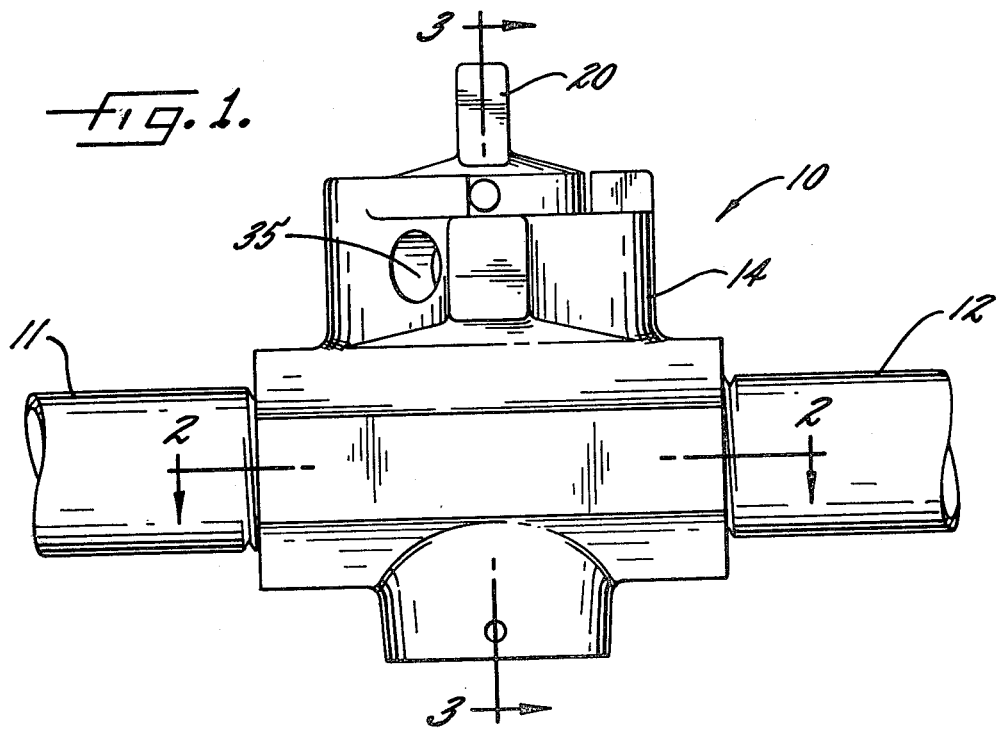
FIG. 1 is an elevational view of a new and improved valve embodying the novel features of the present invention.
Figure 2:
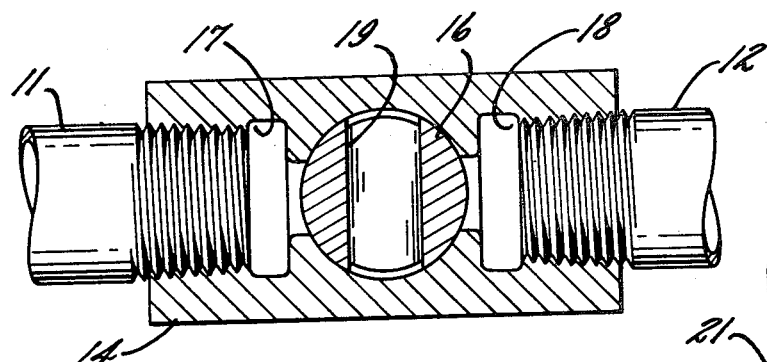
FIGS. 2 and 3 are cross-sections taken substantially along the lines 2—2 and 3—3, respectively, of FIG. 1.
Figure 3:
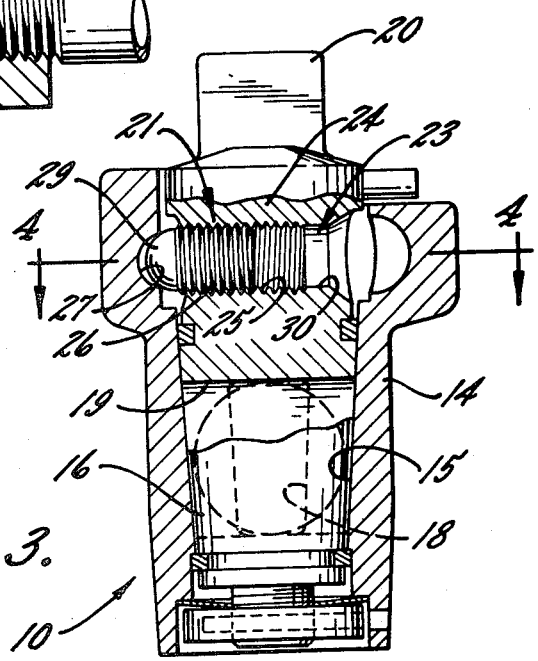

As shown in the drawings for purposes of illustration, the invention is embodied in a valve 10 for use adjacent a gas meter (not shown) and selectively operable to connect gas inlet and outlet lines 11 and 12. The valve includes a main body 14 formed with a central axially extending bore 15 (FIG. 3) into which is telescoped a rotatable valve member 16. Diametrically opposed and radially extending inlet and outlet ports 17 and 18 (FIG. 2) formed in the body lead into the bore and are connected to the inlet and outlet lines 11 and 12, respectively. When the valve member 16 is in an open position, a port 19 extending radially through the valve member alines with and connects the inlet and outlet ports. By turning a handle 20 at the upper end of the valve member, the latter may be rotated to a closed position (see FIG. 2) in which the port 19 is disposed at right angles to the ports 17 and 18 to shut off the flow of gas through the valve.

Figure 4:
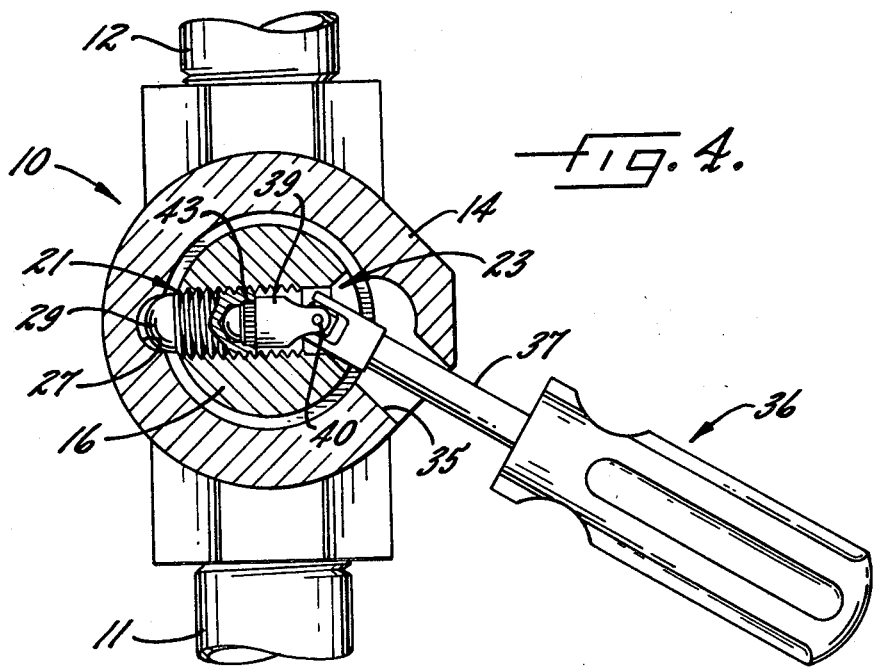
FIG. 4 is a cross-section taken substantially along the line 4—4 of FIG. 3 and showing an exemplary tool inserted into the valve for the purpose of locking or unlocking the pin.

The valve 10 of the so-called pilfer-proof type in that the valve member 16 is adapted to be locked selectively in its closed position by a locking pin or screw 21 (FIGS. 3 and 4) so as to prevent opening of the valve by unauthorized persons. In this way, the gas company may shut off and lock the valve if gas service is discontinued to the customer and the customer cannot simply re-open the valve and wrongfully obtain gas after discontinuance of the service.

In accordance with the present invention, the locking screw 21 is permanently incorporated in the valve member 16 itself so that, in order to lock the valve 10, the gas serviceman need not first install the screw in the valve but instead need only move the screw to a locked position. As a result, the serviceman need not carry a supply of locking screws with him as he makes his calls and is not required to match a particular locking screw with a particular valve. Moreover, the locking screw is uniquely concealed within and protected by the valve member to prevent unauthorized persons from gaining access to and removing the screw or from breaking or destroying the screw. Thus, the valve of the present invention is more nearly tamper-proof than previous pilfer-proof valves and yet is of relatively inexpensive construction as a result of the use of a comparatively simple screw for locking the valve.

More specifically, the locking screw 21 is located in a radially extending hole 23 (FIG. 3) formed through a reduced diameter portion 24 of the valve member 16 and disposed between the port 19 and the handle 20, the hole generally paralleling the port. One end portion 25 of the hole 23 is threaded and the screw is formed with a shank 26 which is screwed into the threaded portion. When the valve member 16 is in its closed position, the hole 23 alines with a locking seat defined by a generally semi-spherical opening 27 formed in the inner wall of the bore 15 opposite the threaded portion 25 of the hole, the opening 27 extending at right angles to the inlet and outlet ports 17 and 18.

When the valve member 16 is closed and the screw 21 is turned and threaded outwardly, a rounded nose 29 (FIG. 3) formed on one end of the screw is projected into the opening 27 and thereby locks the valve member to prevent turning of the latter from its closed position. By turning the screw oppositely, the nose 29 may be retracted from the opening 27 to enable the valve to be opened. Advantageously, an end portion 30 of the hole 23 opposite the threaded portion 25 is formed with a diameter which is less than the mean diameter of the threaded portion and thus the threaded shank 26 jams in the hole 23 after retraction of the screw through a certain distance thereby to prevent the screw from being withdrawn completely from the hole. Accordingly, there is no danger of the screw being removed from the valve and lost or taken away when the serviceman unlocks the valve.

To enable turning of the locking screw 21, an opening 35 (FIG. 4) is formed through the valve body 14 and is adapted to receive a torque-transmitting tool 36 for rotating the screw. Preferably but not necessarily, the opening 35 is offset angularly from the hole 23 with its axis inclined at an angle of about 45 degrees relative to the axis of the hole when the valve member 16 is in its closed position. When the valve member is in such position, the hole 23 is alined with the inner portion of the opening 35 and thus access may be gained to the screw 21 from the outer side of the valve body by inserting the tool 36 through the opening and into the hole. Because, however, the opening 35 is offset angularly from the hole 23, the screw is not visible from the outer side of the valve body and thus it is difficult for unauthorized persons to discover the existence of the screw. In addition, a special and not generally available tool must be threaded through the opening 35 and into the hole 23 in order to turn the screw.

Figure 5:
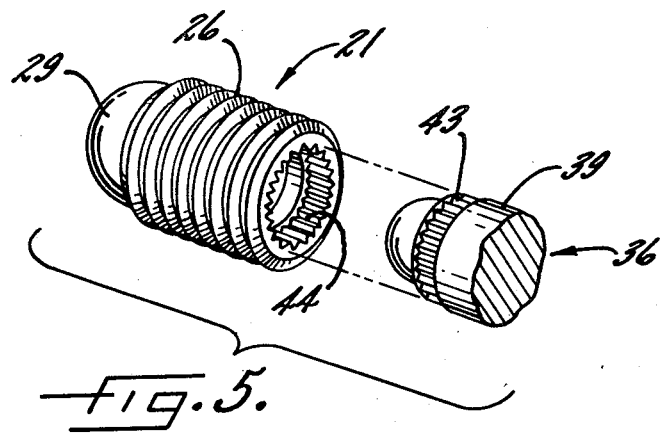
FIG. 5 is an exploded perspective view of the locking pin and part of the tool.

In this particular instance, the tool 36 (FIGS. 4 and 5) which is required for turning the screw 21 is a special screwdriver with a laterally flexible but torsionally stiff shaft which is capable of entering the radially extending hole 23 after first being inserted through the angularly offset opening. While the tool shaft could be made of flexible material, it herein comprises a rigid driving section 37 which is attached to a bit section 39 by a universal joint 40 which permits pivoting of the bit section relative to the driving section while coupling the two sections for turning in unison. On the free end of the bit section is a special bit 43 which is adapted to telescope into torque-transmitting engagement with a socket 44 (FIG. 5) formed in the end of the screw opposite the nose 29. Herein, the bit 43 and the socket 44 are of generally circular cross-section and are formed with complementary serrations which are adapted to mesh with one another to enable turning of the screw by the bit. It will be appreciated, however, that various types of special tool bits or sockets may be used in place of the serrated bit and that the screw may be formed in such a manner as to couple up with the particular tool bit or socket employed.

From the foregoing, it will be apparent that the gas serviceman may lock the valve 10 closed simply by first threading the pivoted bit section 39 through the opening 35 and into the hole 23 to telescope the bit 43 into the socket 44 and then by turning the screwdriver 36 to thread the screw 21 outwardly of the hole so as to cause the nose 29 to seat in the opening 27. Because the screw is always retained permanently in the valve member 16, it is not necessary for the serviceman to install the screw prior to locking the valve. Being protected by the valve member, the screw is not readily accessible and cannot be sawed off or otherwise broken without destroying the valve itself. The angularly offset relationship between the hole 23 and the opening 35 causes the screw to be hidden from the outside of the valve and necessitates the use of a flexible tool 36 for turning the screw, the tool also requiring a special bit 43. The valve thus is fully protected against tampering and yet, at the same time, is comparatively simple and inexpensive in construction.

We claim as our invention:

1. A pilfer-proof valve comprising a valve body having a bore and having inlet and outlet ports communicating with said bore, and a valve member mounted to move in said bore between open and closed positions connecting and disconnecting said ports, the improvement in said valve comprising, a hole extending generally radially through said valve member and threaded along at least part of its length, an opening formed in the inner wall of said bore and leading to the outside of said valve body, one end of said hole registering with said opening when said valve member is in said closed position, a seat on the inner wall of said bore and alined with the other end of said hole when said valve member is in said closed position, and a locking screw threaded into said hole and having one end movable between locked and unlocked positions projecting into and retracted out of said seat in response to turning of a tool inserted through said opening and detachably connected in torque-transmitting engagement with the other end of the screw.

2. A pilfer-proof valve as defined in claim 1 in which said opening is offset angularly from said hole.

3. A pilfer-proof valve as defined in claim 1 in which said seat comprises a second opening formed in the inner wall of said bore opposite said one opening.

4. A pilfer-proof valve as defined in claim 1 in which a first portion of said hole adjacent said seat is threaded and has a predetermined diameter and in which a second portion of said hole adjacent said opening is of lesser diameter thereby to prevent withdrawal of said screw out of said hole through said opening.

5. A pilfer-proof valve comprising a valve body having a bore and having inlet and outlet ports communicating with said bore, and a valve member mounted to rotate in said bore between open and closed positions connecting and disconnecting said ports, the improvement in said valve comprising, a hole extending generally radially through said valve member and threaded along at least part of its length, an opening formed in the inner wall of said bore and leading to the outside of said valve body, said hole registering with said opening when said valve member is in said closed position, a seat on the inner wall of said bore and alined with said hole when said valve member is in said closed position, and a locking screw threaded into said hole and having one end movable between locked and unlocked positions projecting into and retracted out of said seat in response to turning of a tool inserted through said opening and detachably connected in torque-transmitting engagement with said screw.

6. A pilfer-proof valve comprising a valve body having a bore and having inlet and outlet ports communicating with said bore, and a valve member mounted to rotate in said bore between open and closed positions connecting and disconnecting said ports, the improvement in said valve comprising, a hole extending generally radially through said valve member and threaded along at least part of its length, a first opening formed in the inner wall of said bore and alined radially with said hole when said valve member is in said closed position, a second opening formed in the inner wall of said bore and located generally opposite of said first opening, said second opening being offset angularly from said hole and leading to the outside of said valve body, and a locking screw threaded into said hole and having one end movable between locked and unlocked positions projecting into and retracted out of said first opening in response to the turning of a laterally flexible tool threaded through said second opening and into said hole and detachably connected in torque-transmitting engagement with the other end of the screw.

* * * * *